G. DUMONT.
FRICTION DRIVE MECHANISM FOR AUTOMOBILES.
APPLICATION FILED AUG. 9, 1910.
1,096,803.
Patented May 12, 1914.
2 SHEETS—SHEET 1.
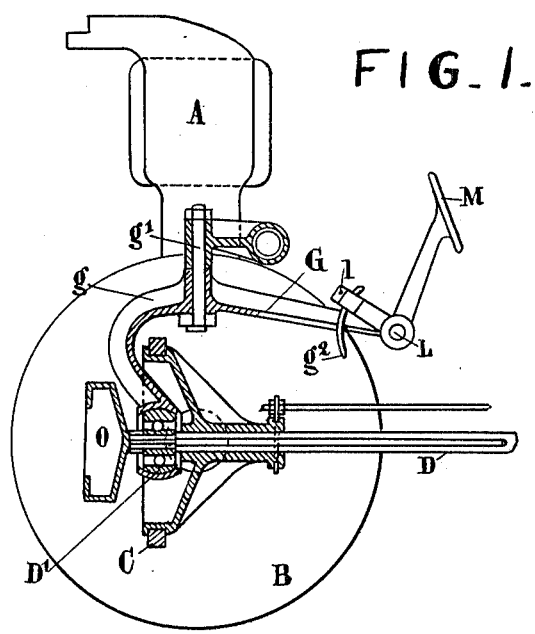
FIG.1.
FIG.2.
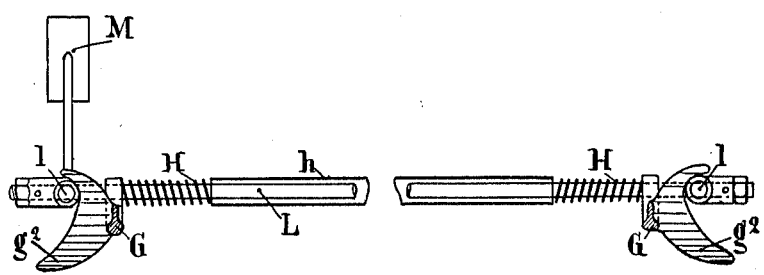
WITNESSES
INVENTOR
Gustave Dumont

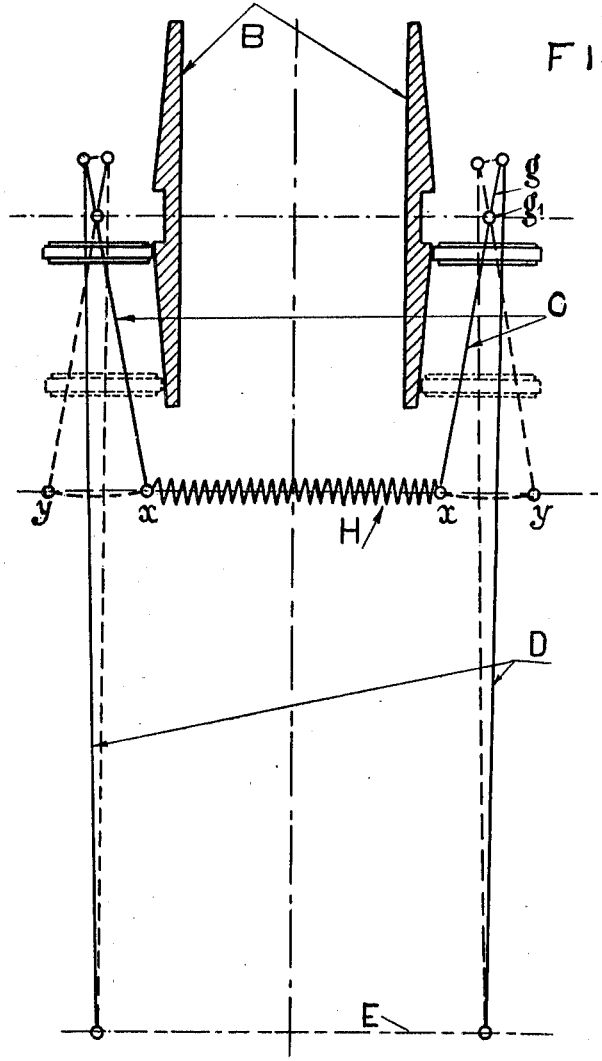

UNITED STATES PATENT OFFICE.

GUSTAVE DUMONT, OF PARIS, FRANCE.

FRICTION DRIVE MECHANISM FOR AUTOMOBILES.

1,096,803.   Specification of Letters Patent.   Patented May 12, 1914.

Application filed August 9, 1910. Serial No. 576,319.

*To all whom it may concern:*

Be it known that I, GUSTAVE DUMONT, a citizen of the French Republic, and residing at Paris, France, have invented a certain new and Improved Friction Drive Mechanism for Automobiles and the like, of which the following is a specification.

My invention relates to friction drive mechanism for automobiles and the like and particularly to improvements in the driving rotor and the control of the friction rotor engaging the same, the object of my invention being to improve the same in the particulars hereinafter mentioned.

In the accompanying drawings, Figure 1 is a vertical section of a friction drive arrangement in which my invention is incorporated; Fig. 2 is a side elevation at right angles thereto of the pedal controlling device; Fig. 3 is a diagrammatic plan of the driving mechanism illustrating the principle of my invention; and Figs. 4 to 9 inclusive are cross sections of driving plates in which my invention is embodied in various forms.

It is desirable in a friction drive mechanism, especially for automobiles, that the pressure of the friction rotors against the driving rotors be variable, being greatest at low speeds and less at high speeds. Better control of the vehicle at low speeds and at starting is thus secured, while an efficient drive at high speed is still maintained with less frictional pressure between the rotors. The rate of progression of the pressure may be varied to suit special conditions and need not necessarily be regular.

A simple and efficient means for accomplishing this result in a machine of the type illustrated in my Patent No. 1,032,350, dated July 9, 1912, is afforded by inclining the face of the driving rotor B against which the friction rotor C bears.

From Fig. 1 it will be observed that the rotor C is slidable on a key on the shaft D, which is geared at its rear end to the driven wheel upon the rear axle E (Fig. 3) while in front it is mounted adjacent the driving rotor B in bearings in the end of the short arm $g$ of the double lever $g$ G pivoted at $g^1$. The driving motor is diagrammatically illustrated in Fig. 1 at A. The spring H mounted on the shaft L presses the arms G apart and thus tends to force the friction rotors C into engagement with the driving rotors B.

To separate the friction rotors C from the disks B and thus obtain an unclutching action, the pedal M is provided fast upon a shaft L, and this shaft carries two arms with antifriction rollers $l$ which bear upon cams $g^2$ fast upon the arms G. When the pedal is depressed the arms G are accordingly moved against the pressure of the springs H to free the driving rotors C from the faces of the disks B.

The strength of the compression spring H being determined when the friction rotor C is at the periphery of the driving rotor B, it is obvious that as the rotor C climbs the incline of the face of the rotor B the compression of the spring H is increased. Furthermore, the arm $g$ of the double lever $g$ G which carries the friction rotor C, being the shorter (ratio 1 to 5 for example) and being the one influenced by the movement of the rotor C across the face of the driver B, the variation in pressure transmitted through the long arm G is greatly increased. A slight inclination of the face of the driving rotor B is thus sufficient to effect the desired result. It is therefore seen that the mere shifting of the friction rotor C along the transmission shaft D for the purpose of varying the speed of the drive, automatically increases or decreases the pressure which the spring H exerts. It is not essential that the plate B be conical with a regular progression of the incline, though it is so shown in the diagram Fig. 3 and in Fig. 4. In Fig. 5 the incline is progressive only at the periphery and in Fig. 9 it is progressive only at the center. In Fig. 6 the face is stepped; in Figs. 7 and 8 the elevation is secured by curved inclines respectively convex and concave.

I do not limit myself to the details of construction shown which may be readily varied without departing from the scope of my invention.

I claim as my invention:

1. A friction driving mechanism comprising a driving rotor, a friction rotor movable across the face of the same, a two-armed lever carrying said friction rotor on one of its arms and a spring constantly bearing upon the other arm of said lever to press said friction rotor against the face of said driving rotor, the face of said driving rotor being shaped to automatically increase the pressure of said spring as the friction rotor is moved toward the center of said driving rotor, together with means for moving said lever against the action of the spring to free the driving rotor from the friction rotor, substantially as described.

2. A friction driving mechanism comprising a driving rotor, a friction rotor movable across the face of the same, a two-armed lever carrying said friction rotor on one of its arms and a spring constantly bearing upon the other arm of said lever to press said friction rotor against the face of said driving rotor, the face of said driving rotor being shaped to automatically increase the pressure of said spring as the friction rotor is moved toward the center of said driving rotor, together with cam means for moving said arm against the action of its spring to free the friction rotor from the face of the driving rotor.

In testimony whereof I have signed my name to this specification, in the presence of two subscribing witnesses.

GUSTAVE DUMONT.

Witnesses:
LEONFRANE HEUL,
DOMINIQUE CASALONGA.

---

Copies of this patent may be obtained for five cents each, by addressing the "Commissioner of Patents, Washington, D. C."